J. PEREPELKIN.
APPARATUS FOR CONTROLLING MECHANISMS AT A DISTANCE.
APPLICATION FILED FEB. 3, 1912.

1,228,963.

Patented June 5, 1917.
5 SHEETS—SHEET 1.

Inventor:
Jacob Perepelkin
Attorney

J. PEREPELKIN.
APPARATUS FOR CONTROLLING MECHANISMS AT A DISTANCE.
APPLICATION FILED FEB. 3, 1912.
1,228,963.
Patented June 5, 1917.
5 SHEETS—SHEET 2.
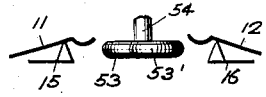
Fig. 9.
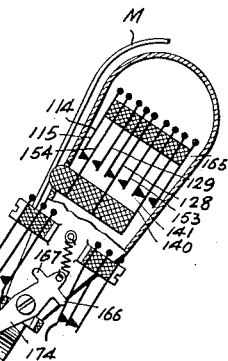
Fig. 3.
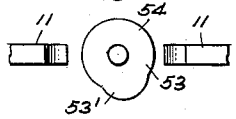
Fig. 10.
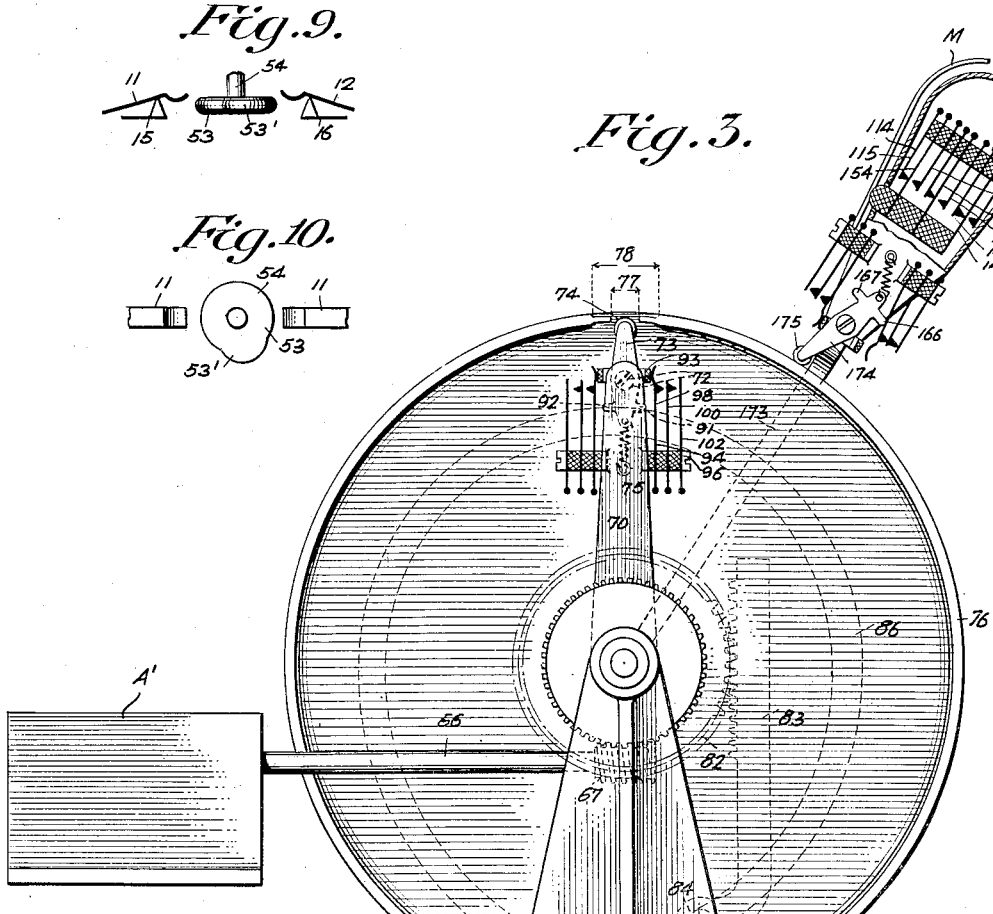
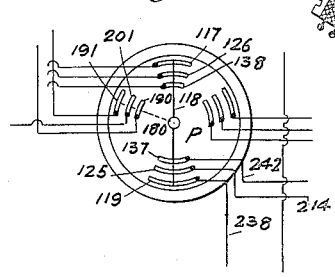
Fig. 7.
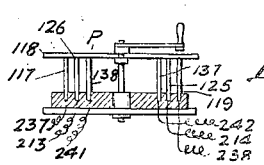
Fig. 8.
Inventor:
Jacob Perepelkin
By Wm E Boulter,
Attorney

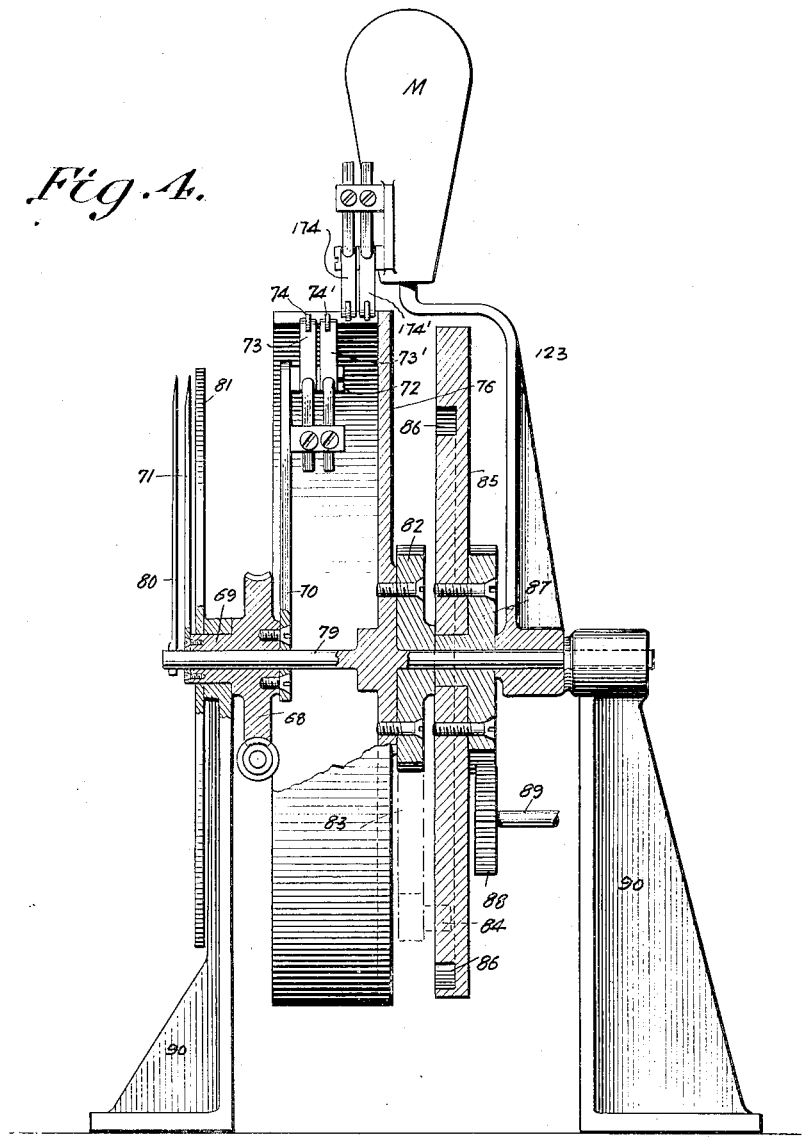

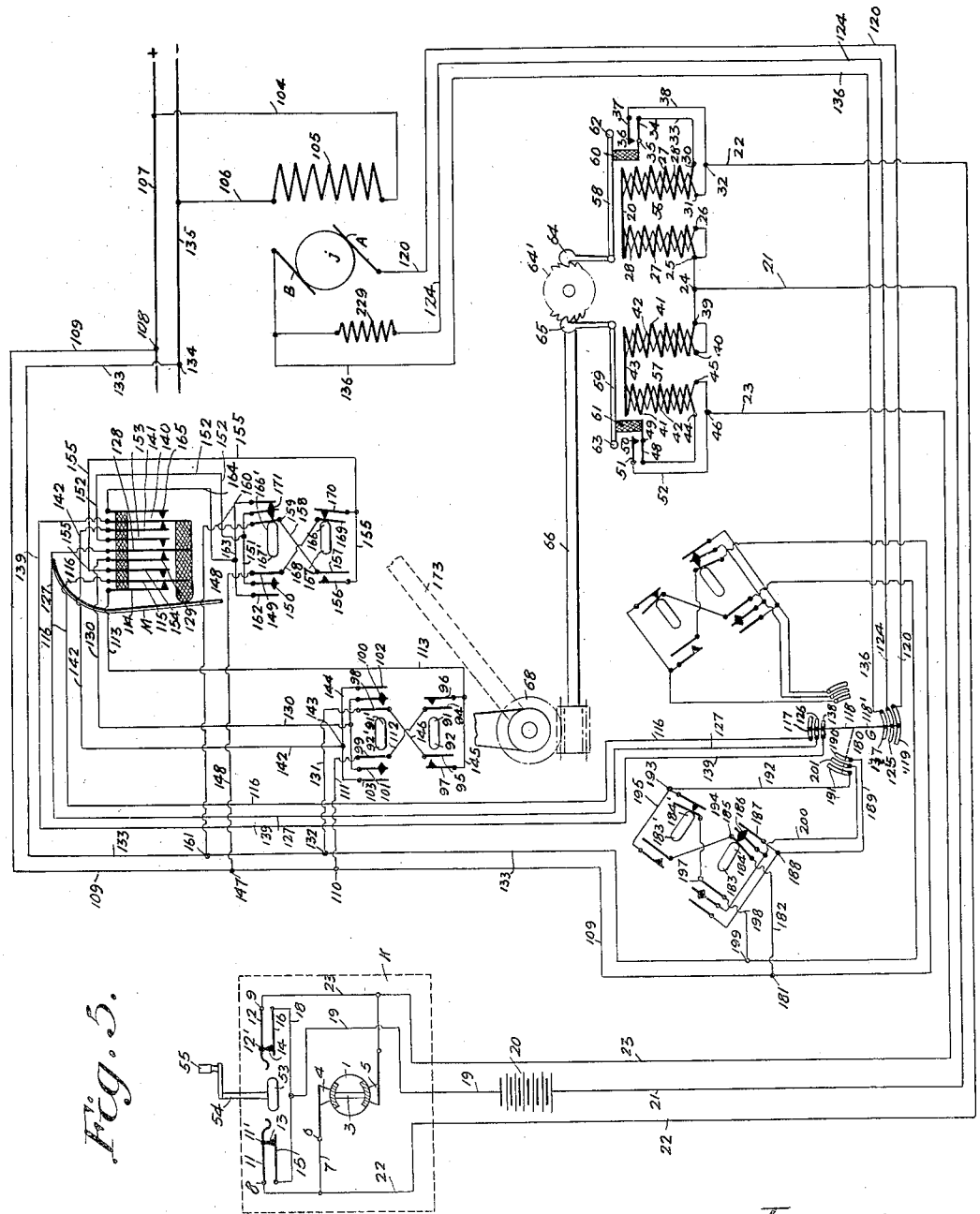

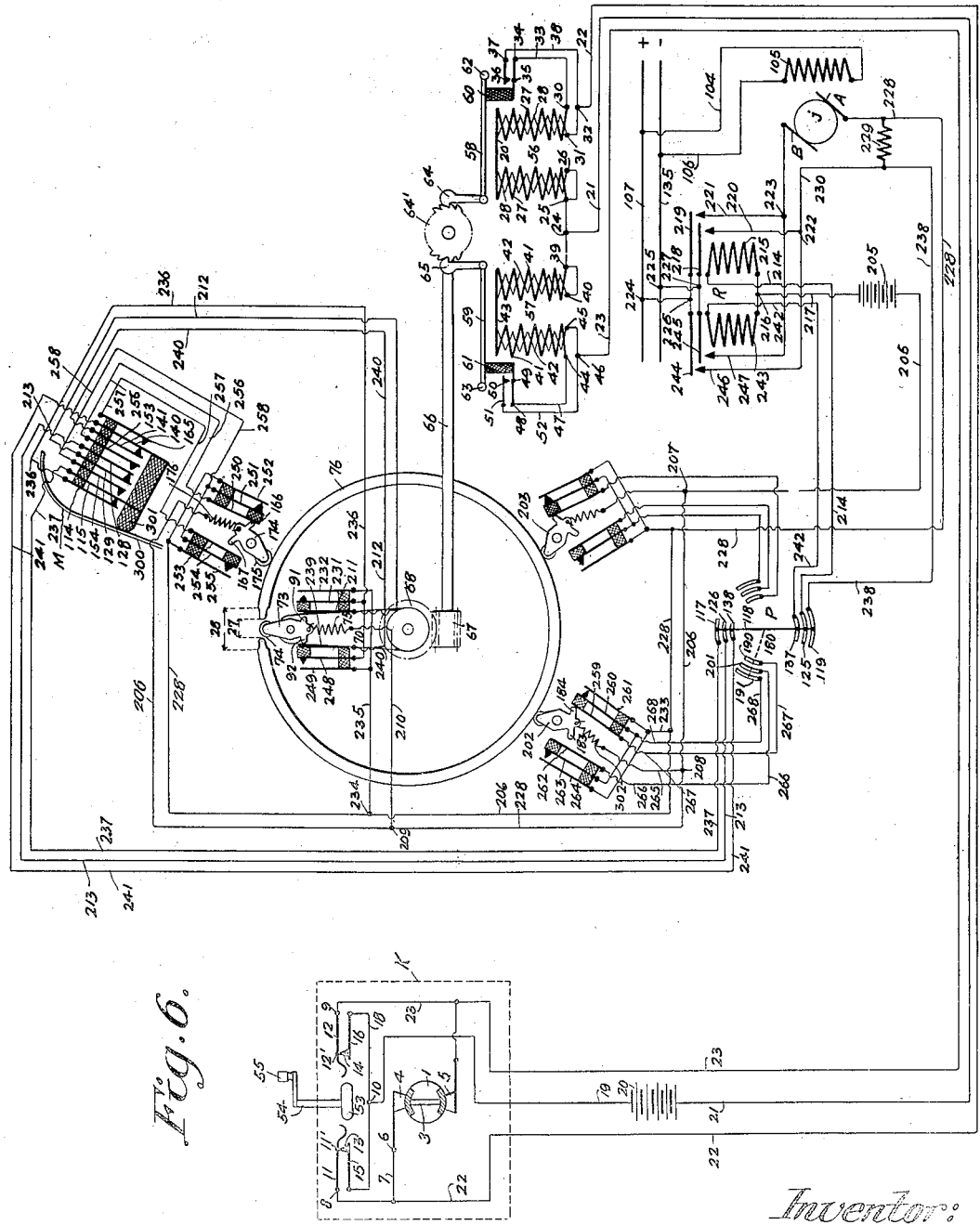

UNITED STATES PATENT OFFICE.

JACOB PEREPELKIN, OF ST. PETERSBURG, RUSSIA.

APPARATUS FOR CONTROLLING MECHANISMS AT A DISTANCE.

1,228,963. Specification of Letters Patent. Patented June 5, 1917.

Application filed February 3, 1912. Serial No. 675,485.

*To all whom it may concern:*

Be it known that I, JACOB PEREPELKIN, a subject of the Emperor of Russia, and a resident of St. Petersburg, Russia, (post-office address Sampsonievsky Prosp. 70,) have invented certain new and useful Improvements in Apparatus for Controlling Mechanisms at a Distance, of which the following is a specification.

The present invention relates to apparatus for controlling mechanisms at a distance and of the kind which have for their object to allow of the automatic control, by means of a transmitter and with any desired accuracy, of one or more distant mechanisms actuated by an electric motor either directly or through controlling means, which motor is controlled to impart motion in a required direction by means of a suitable electric synchronous transmission arrangement operating in such a manner that on an operator moving a pointer of the transmitter through an angle over a graduated dial, correlated with it, into a position corresponding to that which it is desired that the controlled distant mechanism should assume, an index hand at a receiver, installed in the vicinity of the distant mechanism, will be caused to move synchronously over a dial correlated with it and to take up a corresponding position, the receiver index hand being associated with a contact device which normally remains open, but which on the movement of the index from its initial idle position is operated so that a circuit is closed and current is led to the motor, whereupon the said mechanism is caused to move in one direction or another dependent upon the direction of movement of the transmitter pointer, until such time as the mechanism has reached the position corresponding with that into which the transmitter pointer has been adjusted. In apparatus as above referred to, supplementary contact devices, stationary or otherwise, other than that connected with the synchronously movable index, have been provided whereby the current that is employed for controlling the movement and the direction of rotation of the electric motor may be diverted, automatically or otherwise by means of a commutator, to one or other of the supplementary devices whereby the mechanism may be caused to assume a position dependent upon the relative position of the supplementary contact device receiving current at the time.

One or more of these supplementary contact devices may be provided with a switch which may be operated for switching off current from the contact device associated with the synchronously moving index hand to the supplementary device so equipped, in order that the said distant mechanism or mechanisms may be controlled from the place where the receiver is located. Moreover, in apparatus above referred to, it has been proposed to interpose means between the motor and the distant mechanism whereby the movement of the mechanism is effected in such a manner that it is no longer of uniform character, but is in accordance with some law or rule, even although the pointers or index hands of the transmitter and receiver move over dials having equal divisions.

The present invention consists in improvements having for their object to provide means whereby the electric motor for actuating the distant mechanism or mechanisms or their controller may be caused to operate at different speeds during the cycle of operations, so that the controlled mechanism may, at the outset of its movement to assume a desired position, acquire a rapid speed and then a reduced speed as the desired position is approached and reached.

In the drawings:—

Figs. 3 and 4 are front and side views of a receiver with the invention applied.

Fig. 5 is a diagram of electrical connections without relays; and

Fig. 6 is a diagram of electrical connections with relays.

Fig. 7 is a detail plan view of the switch P, and Fig. 8 a side view thereof. Fig. 9 is a detail side view of the parts 53, 54 and contiguous elements, and Fig. 10 is a plan view of said parts.

Figure 1:
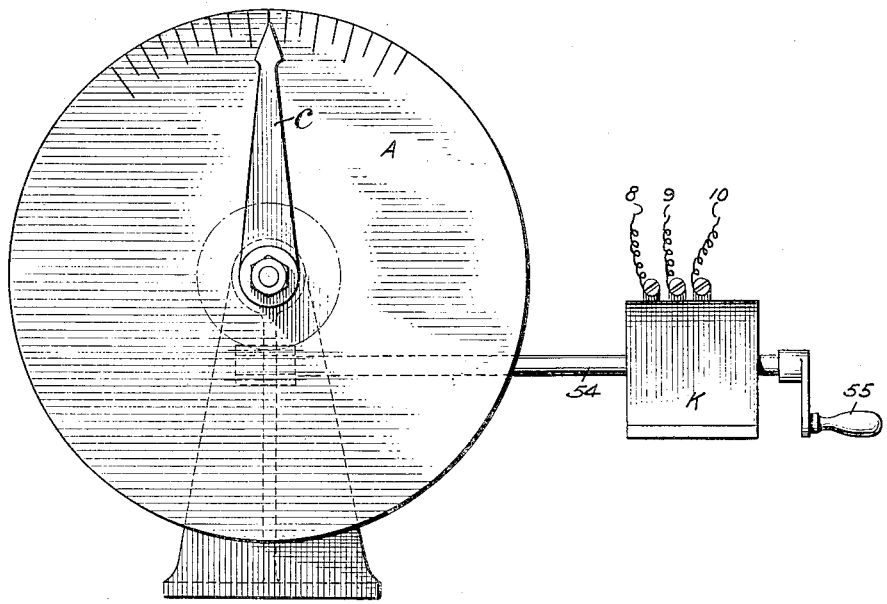
Figures 1 and 2 are a front view and plan of a transmitter.
Figure 2:
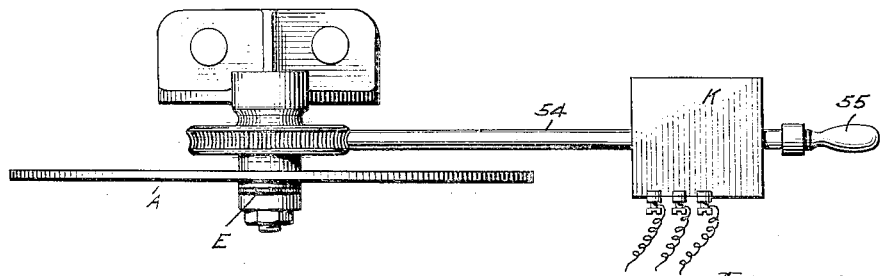

In the drawings, $a$, Fig. 1, is the dial of a transmitter, $c$ a pointer coöperating therewith operated by handle 55 and shaft 54. The transmitter is connected with the receiver or receivers through switch K controlling suitable leads. One or more receivers are supposed installed in the vicinity of the distant mechanisms to be controlled, and connected in parallel with a transmitter, through a suitable switch. Each receiver is coupled with the mechanism which it is to control by means of a shaft 89 and suitable transmission gear 87, 88. Each receiver has a dial 81, the hand 80 of which, secured on axle 79 mounted on suitable brackets 90, is mechanically connected with the mechanism to be controlled. The hand or pointer 71, mounted in coöperative relation with respect to stationary dial 81, is moved through one graduation of the dial on each impulse transmitted from the transmitter and in a direction corresponding to the direction of movement of the operated pointer of the transmitter.

The pointer of the receiver is actuated, and the starting of the motor of the controlled mechanism, in one or other direction corresponding with the movements of the pointer of the receiver, is effected by the means and in the manner following: 76 is a flanged disk or annulus fixed to the axle 79. The mechanical connection between the hand 71 and a hand 70 and the mechanism to be controlled comprises a worm wheel 68 loosely mounted on the axle 79, and adapted to be rotated by the synchronous motor A', synchronously operated by the transmitter, by means of its shaft 66 and worm gearing 67, 68. The two hands 70, 71 are secured to the hub or sleeve of the worm wheel 68, the former being an inner one and the latter on outer one.

The wheel 68 gears with the worm 67 mounted on one end of the shaft 66 whose opposite end carries the ratchet wheel 64'. The teeth on wheel 64' are reversely arranged, that is to say, some of the teeth, as those engaged by pawl 64, are reversely arranged as regards those teeth with which the pawl 65 engages, so that downward movement of one or the other of the pawls will effect rotation in one or the other direction of the ratchet wheel 64' and thus also of the shaft 66 and worm 67.

One or two small levers 73, 73', Figs. 3 and 4, are mounted by means of the pins 72 on the inner hand 70, one lever being used when, as in Fig. 6, a relay is employed, and two levers when, as in diagram Fig. 5, there is no relay. The outer end of the small lever 73 (Figs. 3 and 4) is provided with a roller 74 adapted to slide along the inner surface of the rim of the disk 76. The other end of the lever has a spring 75 tending to retain the lever in a straight or radial position. This inner end of the small lever 73 is provided with projections 91 and 92. Insulated spring pressed contact plates 94, 96, 98, 100 and 102 are arranged on one side of the hand 70, Figs. 3 and 5, when no relay is employed, and a similar set 95, 97, 99. 101, 103 on the other side. The disk 76, Figs. 3 and 4, is provided at one part of its flanged rim with a slot 77; when the outer extremity of the lever 73, together with its roller 74, lies within that slot, the lever itself has a straightened or radial position, as shown in Fig. 3, with its projections 91 and 92 out of contact with the contact plates so that the circuit of the electric motor $j$, Fig. 5, actuating the mechanism to be controlled, remains open. As soon as the synchronous motor A', on receipt of an order from the transmitter, causes the hand 70 to turn, the extremity of the lever passes out of the slot 77, and on becoming inclined one of its projections (91 or 92) will press against the corresponding contact plate, whereupon the motor $j$ commences to rotate. If the hand 70 be only slightly shifted, so that the end of lever 73 does not pass out of a second slot 78 also formed on the same disk 76, the projection of the lever will cause contact between only two of the plates. On the movement of the hand 70 to the right (Fig. 3), for instance, the outer end of the lever 73 is inclined to the left, the projection 91 presses against plate 98 and pushes it against the other plate 100. As this occurs, the circuit of the electric motor is completed through a resistance 229, Figs. 5 and 6. If the hand 70 is turned beyond the limits of the slot 78, then the lever 73 becomes more inclined and its projection 91 will cause contact to occur between all the three plates 98, 100, 102, the resistance is thereupon cut out from the circuit of the electric motor $j$ and the mechanism to be controlled will rotate at full speed.

Let it be supposed that the hand 70 of the synchronous motor A' is turned through a considerable angle, so that the extremity of the lever 73 has passed beyond the limits of the slot 78, so that the motor $j$ works at full speed. The mechanism also rotates in the direction required (which depends on the direction of rotation of the hand 70) at the highest possible speed. By reason of the mechanical transmission between the mechanism to be controlled, and the disk 76, the disk 76 and the hand 80 are caused to rotate in accordance with the movement of the mechanism. Consequently, on the movement of the hand through a certain angle, the electric motor $j$ is automatically caused to rotate, the mechanism moves in a desired direction, it may be at its highest speed, and at the same time the disk 76 also rotates in the direction of the hand 70. When a side of the slot 78 approaches the outer end of the shifted lever 73, the latter will commence to straighten to a certain extent, its projection 91 will withdraw from the contact plates to the same extent and will thus cause the contact between the plates 102 and 100 to break, owing to which fact the resistance 229 will be introduced into the circuit of the electric motor $j$, whereupon its rotation will be slowed down, and as soon as the lever 73 again passes into the slot 77 the lever will become quite straight again and contact between the plates 98 and 100 will cease. Current in the circuit will thus be interrupted, so that the motor, and together with it the mechanism to be controlled, will stop and the hands 71 and 80 on the dial of the receiver will then be in register one with the other. The mechanism will have then taken up a position corresponding to the adjustment sent from the transmitting station.

Apparatus with the present invention applied may in practice have to be employed in cases where, as stated above, the movements of the machinism to be controlled are to be in accordance with some law or rule, as for instance in the case in which the apparatus is employed in conjunction with mechanism for elevating guns. The angles of elevation for a gun are not in proportion to the range distances, but follow known rules to be found in known gun-fire tables. Now the dial of the receiver is graduated similarly to the dial of the transmitter, being divided into equal spaces, and the hand 71 of the receiver moves uniformly over the whole scale, but the angles of elevation of the gun will not change uniformly, but according to the rules. To allow for this in elevating a gun the following arrangements are provided at the receiver: A disk 85 loosely rotates on the shaft 79. With the aid of a transmission gear 87, 88 and 89, this disk turns with the rotation of the gun, about the axis of its trunnions, so that the angles of rotation of the disk and gun are in direct proportion to each other. The disk has a curvilineal groove 86, the contour of which is dependent on the relations between the angles of elevation and range distances. The rack 83 is capable of moving only in guides and in a longitudinal direction. It is provided with a finger or projection 84, which engages in the curvilineal groove of the disk. On the rotation of the disk, the finger forces the rack to move in a manner in accordance with the calculated contour of the groove, that is according to a rule. The rack meshes with a toothed pinion 82 which is secured to the disk 76. It will be seen that on the movement of the hand 70 through a distance of several graduations of the scale, the disk 76 will turn through the same angle and its slot will only approach the outer extremity of the rotated lever 73 when the gun has changed its angle of elevation to an extent corresponding to the alteration in distance. Such a construction permits the control from one transmitter of guns of various caliber, if at the receiver disks 85 having grooves 86 designed to correspond to the firing table for each gun are provided.

Cases may arise where there are several sets of controlling arrangements installed at the same receiving station and comprise each a hand 70, a lever 73 and the coöperating contact devices, and also stationary supplementary contact devices. Fig. 3 shows such a combination. In that figure, levers 202, 203 and their coöperating parts are installed on fixed shafts, and a switch P is supplied which is adapted automatically or otherwise to switch off current from the parts coöperating with the lever 73 and lead it to the parts coöperating with either of the levers 202 and 203 as shown in Fig. 6. In this way the mechanism to be controlled will be actuated by that lever which is at the time receiving current and the disk 76 77 will be stopped with its slot opposite said lever.

In the case of a gun, supposing that the position of lever 202 corresponds exactly with that in which the loading of the gun is to be effected. The gun is adjusted only from the transmitter at the central station as regards angles of elevation depending upon distances, the operating current in the coöperating contacts of the lever 73 and the motor of the elevating mechanism, as well as the gun itself, being controlled from the central station. On the recoil of the gun after firing, the operating current is automatically switched away from the contacts of the lever 73 to the contacts of the lever 202. The elevating mechanism operates until the slot of disk 76 approaches the lever 202, when the position of the gun will correspond with the loading position. When the gun has been loaded and its breech block closed, the operating current, by means of this latter operation, will be re-switched into the contacts of lever 73, and the gun will be again under the control of the person at the central station. The device 203 may be used for performing some other function.

Besides these permanently stationary lever devices 202, 203, other adjustable but similarly operating arrangements may be provided. A bracket 173, Fig. 4, having a switch handle M rotates on the axle 79 of the receiver. A lever 174, which is similar to the lever 73 described above, is installed on that bracket. If the handle M is left free, that is, with its switch contacts open, the maneuvering or operating current passes through the contacts of lever 73 arranged on the hand 70 connected with the synchronous motor. If the handle M is pressed, to close its contacts, the maneuvering current is transferred to the contacts of lever 174, and the mechanism will be influenced by this latter. As soon as the handle is released the controlling of the mechanism is again transferred to the lever 73.

The commutator K (Figs. 1, 5 and 6) hereinbefore mentioned consists of a handle 55 fixed on one end of the shaft 54 and on the other end of which shaft is fixed an eccentric 53 designed to break the contacts 11', 13, and 12', 14, between the contact springs 11, 15 or 12, 16 respectively, according to the direction in which the handle 55 is turned. For this purpose the eccentric is provided with a projection 53' which is adapted to press upon either the spring 11 or the spring 12 when the eccentric 53 is turned in one or the other direction so as to break the contacts hereinabove mentioned. The springs 11 and 12 are connected with leads 22 and 23, and the springs 15 and 16 are connected together by wire 18 and with the lead 19 at the point 10. When the apparatus is at rest the leads 22 and 23 are in communication with each other by means of a rotatable commutator 4, 3, 1, 5, fixed on a separate shaft which passes through the shaft 54, which latter is hollow, and said separate shaft being provided with a handle (not shown) which is arranged in respect to the eccentric 53 in such a manner that when this eccentric is turned its arm, after having acted upon the contact spring 11 or 12, moves the handle of the disk 1 and breaks for a short time the communication between the leads 22 and 23, whereby the motor A' begins its work. After the arm of the eccentric 53 leaves the handle of the disk 1, this latter is returned to its former position, for instance by a spiral spring (not shown) fixed to the shaft of the commutator. It is preferred that the part 1 be turned after a complete revolution of the handle 55.

The switch P consists of a series of isolated metallic plates 117, 126, 138,—191, 201, 190,—119, 125, 137, etc., in the form of concentric arcs of circles to which the corresponding leads abut. In the center of the series of these arcs is mounted a rotatable rod or handle 118 which in its different positions establishes the desired contacts or communications between the corresponding leads. The switch P also comprises a fixed arm 118' which at one end is in electrical contact with contacts 119, 125 and 137, and at the opposite end is in electrical contact with one end of the rotatable arm 118 whose other end is in electrical contact with contacts 117, 126 and 138 when the arm 118 is in the full line position seen in Fig. 6. Thus when the arms 118 and 118' are in the position shown in full lines in Fig. 6, the contacts 137 and 138 are in electrical communication, as are contacts 125 and 126, and contacts 119 and 117.

The switch P works in conjunction with the commutator K and the synchronous electromagnetic motor A' in the following manner: At each revolution of the shaft 54 the communication between the leads 22, 23 is interrupted, as described, in consequence of which the electromotor A' moves the hand 70 with its lever 73 one step farther. The point of the latter being withdrawn from the slot 77—78 of the disk 76, this lever is inclined to the right or the left according to the direction in which the hand 76 is rotated. The lever 73 in its inclined position closes the contacts 249—248, 239—92, or 232—231, 211—91, whereby a current is sent to the electro-motor J which causes the disk 76 to be turned in the same direction. This disk turns until its slot 77 arrives opposite a small roller 74 at the end of the lever 73. At this moment the lever 73 is brought into its straight or middle position by the spring 75, and the contacts 249—248, 239—92 or 232—231, 211—91 are interrupted. Thus by turning the handle 55 of the commutator K it is possible to impart any desired movement to the disk 76 and to control in this way the working of any distant mechanism which is moved by the electro-motor J.

In this case, the rod or handle 118 of the switch P must have such a position as to bring into communication with each other the contacts 137 and 138, 125 and 126, 119 and 117, as shown in Fig. 5.

If the handle 118 is turned to the position 180 (shown by dotted lines in Fig. 6) then the contacts 137 and 190, 125 and 201, 119 and 191 will be no longer controlled by the commutator K. In this case the electromotor J will cause the disk 76 to rotate until its slot 77 reaches the end of the lever 202. A similar operation will take place in respect to the lever 203 if the handle 118 be turned to the right hand contacts.

The purpose of the handle M with its contacts and its lever 174 is the same as that of the levers 202 and 203. The only difference is that the levers 202 and 203 are stationary while the handle M can be freely turned on the shaft 79 (Figs. 3 and 4) and fixed in any desired position in respect to the disk 76.

The motor A' consists of two electromagnets, each of which is provided with a fine winding (wire) 42, 28 respectively, and with a thick winding 41, 27 respectively. The ends 40, 39, and 25, 26, are joined together and with the lead 21. The ends 45, 31, of the fine windings are joined directly to the leads 23, 22 by means of current breakers 48—49, 51—50, and 34—35, 37—36 respectively, which are acted upon by the armatures 59, 58, of the electro-magnets.

If the apparatus is at rest, the current passes continuously from the battery or other source of electricity 20 (Fig. 5)

through the lead 21, and the thin windings of the electro-magnets, and returns by the lead 23 or 22 and through the commutator K to the battery 20. The armature 59 or 58 is attracted and the thick windings receive no current because the contacts 49—50 and 35—36 are interrupted.

When the commutator K is turned, the current in one of the leads 23 or 22 will be broken, as described, and the corresponding electro-magnet being not excited its armature will be drawn away from the core. By this movement the corresponding pawl 65 or 64 passes over one tooth of the ratchet wheel 64' and at the same time one of the current breakers 50—49 or 35—36 will be closed and the current will pass through both the fine and the thick winding of the electro-magnets. This causes the armature to be attracted and by the downward motion of the armature the pawl turns the ratchet wheel by which the motion is transmitted to the shaft 66.

The action of the devices arranged as shown in the diagrams of Fig. 6 in which a relay is employed will now be described. The hand 70 of the receiving apparatus is provided, as before, with a lever 73 having projections 91 and 92. Contact spring plates, insulated from one another, are secured on the hand 70; on the right side 211, 231, and 232; on the left side, 239, 248 and 249. Let it be supposed that the hand 70 moves to the right while its lever does not pass out of the limits of the slot 78. The projection 91 on the right will effect a contact with the plate 211.

107 and 135 are the motor supply leads, 105 is the induction or field coil of the electric motor $j$; 205 the source of the current, which may be any electric main. The course of the current in the circuit of relays will be (1) 205—206—209—210—75—73—91—211—212—129—128—213—126—118—125—214—215—216—217—205.

The circuit of the right hand electro-magnetic relay R will become closed—the right hand armature 218 and 219 will be attracted, the circuit of the armature of the motor $j$ will be closed as follows: (2) 107—224—226—219—221—223—B—A—229—230—222—220—218—227—225—135.

Let it be supposed that the hand 70 moves to the left. The course of the current in the circuit of the relays will be: (3) 205—206—209—210—75—73—92—239—240—141—140—241—138—118—137—242—243—216—217—205.

The circuit of the left hand electro-magnetic relays will be closed, the armatures 244 and 245 will be attracted. The course of the current in the circuit of the motor $j$ will be as follows: (4) 107—224—226—244—246—222—230—229—228—A—B—223—247—245—227—225—135.

The motor $j$ will rotate in the opposite direction.

Supposing that the hand 70 moves to the right and its lever 73 passes out of the limits of the slot 78. The course of the current in the circuit of the relay remains the same, as described above (1). The course of the current in the circuit of the armature of the motor $j$ will change by the fact that the resistance 229 will be short circuited as follows: (5) 107—224—226—219—221—223—B — A—228—234—235—232—231 — 236—114—115—237—117—118—119—238—230—222—220—218—227—225—135.

As is seen, by comparing the circuit diagrams (2 and 5), the armature of motor $j$, on the movement of the hand 70 to the right within the limits of the slot 78 and beyond its limits, will rotate in one and the same direction, but at different speeds.

On the turning of the hand 70 to the left beyond the limits of the slot 78 the circuit (3) remains the same, the circuit (4) changes by reason of the fact that the resistance 229 will be short circuited. The circuit of the motor will be:
(6) 107—224—226—244—246—222—230—238—119—118—117—237—115—114—236—248 — 249—235—234—228—A—B — 223—247—245—227—225—135.

In Fig. 6 the handle M is shown in a non-pressed state; that is to say, with its contacts open. If it should be pressed, then the plate 300 will shift the insulating plate 301, together with the contact plates 115, 128, 140, and new contacts 115—154, 128—153, 140—165 will be obtained.

When the switch handle M is pressed and its contacts closed, the circuit will be:
(7) 205—206—176—166—250—256—153—128—213—126—118—125—214—215—216—217—205.

When the relay is operated, the armatures 218 and 219 are attracted. The circuit of the armature of the motor $j$ will be:
(8) 107—224—226—219—221—223—B—A—228—252—251—258—154 — 115 — 237—117—118—119—238—230 — 222 — 220—218—227—225—135.

The motor works at full speed having the resistance 229 cut out. As soon as the side of the slot 78 of disk 76 approaches the lever 174, the latter lever will become somewhat straightened and will interrupt the contact between the plates 252 and 251. The course of the current in the circuit of the armature of motor $j$ will be:
(9) 107 — 224—226—219—221—223—B—$j$—A—229—230—222—220 — 218 — 227—225—135. The resistance 229 will be inserted and the motor $j$ will work at a slow speed, and when the slot 77 approaches the lever 174 the latter will be completely straightened, the circuit will be broken and the motor will stop.

If the lever 174 were turned in the opposite direction, it is easy to see that the results will be analogous to those above mentioned and the rotation of the motor would be in a reverse direction.

If the arm of switch P is transferred to the position 180, the mechanism will be controlled by the lever 202.

In the position shown in Fig. 6 the course of the current in the circuit of the relay will be:

(10) 205—206—208—265 — 302 — 202—184—259—267—190—118 — 137 — 242—243—216—217—205.

The armatures 244 and 245 are attracted. The course of the current in the circuit of the armature of motor j will be:

(11) 107—224—226—244 — 246 — 222—230—238—119—118—191 — 268 — 260—261—223—228—A—B—223 — 247 — 245—227—225—135.

When the slot 78 of the disk 76 approaches the lever 202, the latter will be straightened somewhat, and will break the contact between the plates 260 and 261. Owing to this, the resistance 229 will be introduced into the circuit of the armature of motor j. The course of the current of the armature of motor j will be:

(12) 107—224—226—244 — 246 — 230—229—A—j—B—223—247 — 245 — 227—225—135.

The diagram in Fig. 5 shows a case when there is no relay. Applying to the circuits in the various combinations of the operating current numerals similar to the preceding ones, but with an index, we will obtain:

(2') 107—108—109—110 — 111 — 99—112—94—96—113—114—115 — 116 — 117—118—119—120—A—B—121 — 122 — 229—124—125—118—126—127 — 128 — 129—130—100—98—131—132—133—134—135.

(4') 107—108—109—110 — 111 — 99—112—94—96—113—114—115 — 116 — 117—118—119—120—A—B—121 — 122 — 136—137—118—138—139—140 — 141 — 142—143—144—102—100—98—131—132 — 133—134—135.

(5') 107—108—109—110 — 111 — 99—101—130—129—128—127 — 126 — 118—125—124—229—122—121—B — A — 120—119—118—117—116—115 — 114 — 113—145—97—95—146—98—131 — 132 — 133—134—135.

(6') 107—108—109—110—111—99—101—103—143—142—141—140—139—138—118—137 — 136—121—B—A—120—119 — 118—117 — 116—115—114—113—145—97 — 95—146—98—131—132—133—134—135.

(8') 107 — 108—109—147—148 — 149 —168—169—170—155—154—115—116—117—118 — 119—120—A—B—121—122 — 136—137—118—138—139—140—165—164—163—172—171—159—160—161—133—134—135.

(9') 107 — 108—109—147—148 — 149 —168—169—170—155—154—115—116—117—118 — 119—120—A—B—121—122 — 229—124—125—118—126—127—128—153—152—171—159—160—161—131—134—135.

(11') 107 — 108—109—181—182 — 185—186—187—188—189—190—180—137—136—121 — A—B—120—119—180—191 — 192—193—194—195—196—197—198—199—133—134—135.

(12') 107 — 108—109—181—182 — 185—186—200—201—180—125—124—229—122—121—120—119—180—191—192—193—194—195—196—197—198—199—133—134—135.

What I claim is:

1. In an apparatus of the character described, the combination with a transmitting device comprising a dial, an index hand adapted to travel over said dial, and means for operating said hand, of a receiving device comprising a dial and two hands, one of which is adapted to travel over the latter dial, an electric motor synchronously operated from the transmitting device, connections between the said motor and one of the hands of the receiving device, an electric motor adapted to actuate the mechanism to be controlled, an electric circuit in which the last-mentioned motor is included, and mechanism controlled by the movement of one of the hands of the receiving device to cause the last-mentioned motor to operate in one direction or another and at different speeds during the period that it is controlled and according to the degree and direction of movement of the index hand of the transmitting device.

2. In an apparatus of the character described, the combination with a transmitting device comprising a dial, an index hand adapted to travel over said dial, and means for operating said hand, of a receiving device comprising a dial and two hands, one of which is adapted to travel over the latter dial, an electric motor synchronously operated from the transmitting device, connections between the said motor and one of the hands of the receiving device, an electric motor adapted to actuate the mechanism to be controlled, an electric circuit in which the last-mentioned motor is included, and mechanism controlled by the movement of one of the hands of the receiving device to cause the last-mentioned motor to operate in one direction or another and at different speeds during the period that it is controlled and according to the degree and direction of movement of the index hand of the transmitting device, said mechanism comprising an electrical resistance through which the circuit of the last-mentioned electric motor is adapted to be completed, and said resistance being also adapted to be cut out of the said circuit to permit the said motor to rotate at full speed.

3. In an apparatus of the character described, the combination with a transmitting device comprising a dial, an index hand adapted to travel over said dial, and means for operating said hand, of a receiving device comprising a dial and two hands, one of which is adapted to travel over the latter dial, an electric motor synchronously operated from the transmitting device, connections between the said motor and one of the hands of the receiving device, comprising a shaft and a gear wheel loosely mounted on said shaft and to which gear wheel one of the said two hands of the receiving device are connected, a disk loosely mounted on the said shaft and provided in one face with a curvilineal groove as described, connections between said disk and the mechanism to be controlled, a second disk fixedly mounted upon the said shaft, a toothed pinion carried by the latter disk, a rack meshing with said pinion, a projection on the rack engaging within the said curvilineal groove, a lever pivotally carried by one of the hands of the receiving device and adapted to engage within slots in the disk last mentioned, a spring acting upon said lever as described, an electric motor adapted to actuate the mechanism to be controlled, an electric circuit in which the latter motor is included, contact plates included in the said circuit and arranged to be successively brought into contact with each other by the said lever when the latter is turned as set forth, and an electrical resistance adapted to be brought into and out of the circuit of the last-mentioned electric motor according to the degree of movement imparted to the pivoted lever by the slots in the disk.

In testimony whereof, I have signed my name to this specification in the presence of two subscribing witnesses.

JACOB PEREPELKIN.

Witnesses:
  H. A. LOVIAQUINE,
  A. N. TSCHERALEFF.